United States Patent
Scheer et al.

(10) Patent No.: US 7,644,114 B2
(45) Date of Patent: Jan. 5, 2010

(54) SYSTEM AND METHOD FOR MANAGING MEMORY

(75) Inventors: Roque Scheer, Porto Alegre (BR); Luciano Andre Stertz, Venancio Aires (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 112 days.

(21) Appl. No.: 11/630,699

(22) PCT Filed: Jul. 8, 2005

(86) PCT No.: PCT/US2005/024433
§ 371 (c)(1),
(2), (4) Date: Apr. 15, 2008

(87) PCT Pub. No.: WO2006/019656
PCT Pub. Date: Feb. 23, 2006

(65) Prior Publication Data
US 2009/0006505 A1   Jan. 1, 2009

(30) Foreign Application Priority Data
Jul. 23, 2004   (GB) ................... 0416483.6

(51) Int. Cl.
*G06F 17/30* (2006.01)
(52) U.S. Cl. ......................................... 707/206
(58) Field of Classification Search ............... 707/204, 707/205, 206
See application file for complete search history.

(56) References Cited

U.S. PATENT DOCUMENTS

| | | | |
|---|---|---|---|
| 4,989,134 A | 1/1991 | Shaw | 707/206 |
| 5,680,542 A * | 10/1997 | Mulchandani et al. | 714/28 |
| 2008/0114923 A1 * | 5/2008 | In et al. | 711/103 |

* cited by examiner

*Primary Examiner*—Cheryl Lewis

(57) ABSTRACT

A method that allows use of a memory page dirty bit by a number of modules.

17 Claims, 4 Drawing Sheets

SYSTEM AND METHOD FOR MANAGING MEMORY

FIELD OF THE INVENTION

The invention relates to digital computing. In particular, the invention relates to the use of a page dirty flag by two or more modules to manage memory.

BACKGROUND OF THE INVENTION

Digital computers commonly use dirty bits to enhance performance of memory systems. In particular, virtual memory is a feature present in all modern computers. These computers include a module usually called the Memory Management Controller (or Unit) (MMC or MMU), which enables the use of virtual memory. The MMC allows the operating system (OS) to split the memory allocated for each process into fixed size memory pages and place these pages anywhere in the actual memory (RAM). The MMC then provides on-the-fly translations of the logical (or virtual) memory addresses referenced by the processor instructions into the corresponding physical addresses.

When the physical memory is not large enough to hold all the pages for all the processes running at the same time, the OS can temporarily store (page out) some of them on peripheral memory (usually a hard disc). When a running process references a page that is out, the MMC generates an exception to the OS, which should then allocate a page of physical memory and read its contents from the disc before resuming the process' execution. If there are no physical memory pages available, the OS releases other pages, possibly saving their contents to disc.

The MMC usually has several functions that help the OS optimise this memory management. If a memory page has not been modified since it was loaded from the disc, it does not need to be saved to disc when the OS needs to reuse that page for another process. The OS can simply de-allocate the page.

When the processor or a ny other device writes on a memory page, a special bit on the MMC hardware is set to indicate that the page contents were modified. Such bits exist for every physical memory page present on the system, and are usually called dirty bits, as memory pages that have been modified are commonly said to be "dirty". When the operating system needs to reuse a page, it checks this bit to learn if the page is dirty. If it is not, the page can simply be discarded, avoiding unnecessary rewriting of the non-modified contents to disc. If the page is dirty, it must be saved and the dirty bit can then be reset.

These dirty bits are managed by the OS and are usually invisible to applications and processes running outside of the OS's kernel. However, this detection of memory page content modification implemented in hardware can also be used for optimising other algorithms which are usually implemented at the application level, the most notable example being memory garbage collection. Garbage collectors allow applications to dynamically allocate memory blocks without the need to explicitly release them when they are not needed any more. The garbage collection algorithm frequently inspects the processes' memory space to identify blocks that are no longer being referenced. Such blocks can be returned to a free memory pool to be reallocated when the need arises.

The garbage collection could be considerably optimised if the collector knew which portions of a process' memory space have been modified since the last garbage collection cycle occurred. If a given memory block has not been modified since then, it does not need to be scanned again to look for blocks not being referenced. To do this a mechanism similar to the dirty bit would be needed at the application level.

U.S. Pat. No. 4,989,134 describes a system for enhancing these mechanisms. The system creates a saved state map that prevents the garbage collector from interfering with the virtual memory tasks. A memory manager checks both a primary dirty page map and the saved state map to determine whether a page is clean or dirty. However, there are only two dirty bits (including backup dirty bits) for each page in primary memory, and the memory manager and garbage collector do not set or reset each other's dirty bits. This means that the system cannot be extended to a larger number of applications.

SUMMARY OF THE INVENTION

It is an object of the invention to provide a method that allows the use of a page dirty bit by a number of modules.

In a first aspect the invention provides a method of managing memory, wherein the memory stores a page and the page has a corresponding dirty flag, the method including:
a) providing a first backup flag for the page;
b) providing a second backup flag for the page;
c) checking both the dirty flag and the first backup flag to determine whether the page is clean or dirty with respect to a first module; and
d) checking both the dirty flag and the second backup flag to determine whether the page is clean or dirty with respect to a second module;
e) resetting the dirty flag and the first backup flag to mark the page as clean with respect to the first module; and
f) if the dirty flag is in a set state before step e) is performed, setting the second backup flag.

In a second aspect the invention provide s a method of managing memory, wherein the memory stores a page and the page has a corresponding dirty flag, the method including:
a) providing a plurality of backup flags for the page, each backup flag corresponding to a module,
b) checking the dirty flag and the backup flag corresponding to a first module to determine whether the page is clean or dirty with respect to the first module;
c) resetting the dirty flag and the backup flag corresponding to the first module to mark the page as clean with respect to the first module; and
d) if the dirty flag is in a set state before step c) is performed, setting each of the backup flags except the backup flag corresponding to the first module.

In a third aspect the invention provides an apparatus including memory and a processor, the memory including primary memory, the processor being configured to perform the operations of a plurality of modules,
the primary memory being configured to store data in a page;
the apparatus being configured to maintain in the memory a dirty flag, a first backup flag and a second backup flag for the page; and
the processor being configured:
to determine whether the dirty flag and each of the backup flags is in a set or reset state,
to check both the dirty flag and the first backup f lag to determine whether the page is clean or dirty with respect to a first module,
to check both the dirty flag and the second backup flag to determine whether the page is clean or dirty with respect to a second module,
to reset the dirty flag and the first backup flag to mark the page as clean with respect to the first module; and
to set the second backup flag if the dirty flag is in a set state before the dirty flag and the first backup flag are reset.

In a fourth aspect the invention provides an apparatus including memory and a processor, said memory including primary memory, the processor being configured to perform the operations of a plurality of modules, the primary memory being configured to store data in a page;

the apparatus being configured to maintain a dirty flag and a plurality of backup flags for the page, each backup flag corresponding to a module, the processor being configured:

to determine whether the dirty flag and each of the backup flags is set or reset, to check the dirty flag and the backup flag corresponding to a first module to determine whether the page is clean or dirty with respect to the first module;

to reset the dirty flag and the backup flag corresponding to the first module to mark the page as clean with respect to the first module; and to set each of the backup flags except the backup flag corresponding to the first module if the dirty flag is in a set state before the dirty flag and the backup flag corresponding to the first module are reset.

BRIEF DESCRIPTION OF THE DRAWINGS

The invention will now be described by way of example with reference to the accompanying drawings, in which:

FIG. 1a is a second flow chart illustrating the method of the invention;

DESCRIPTION OF THE INVENTION

Figure 1:
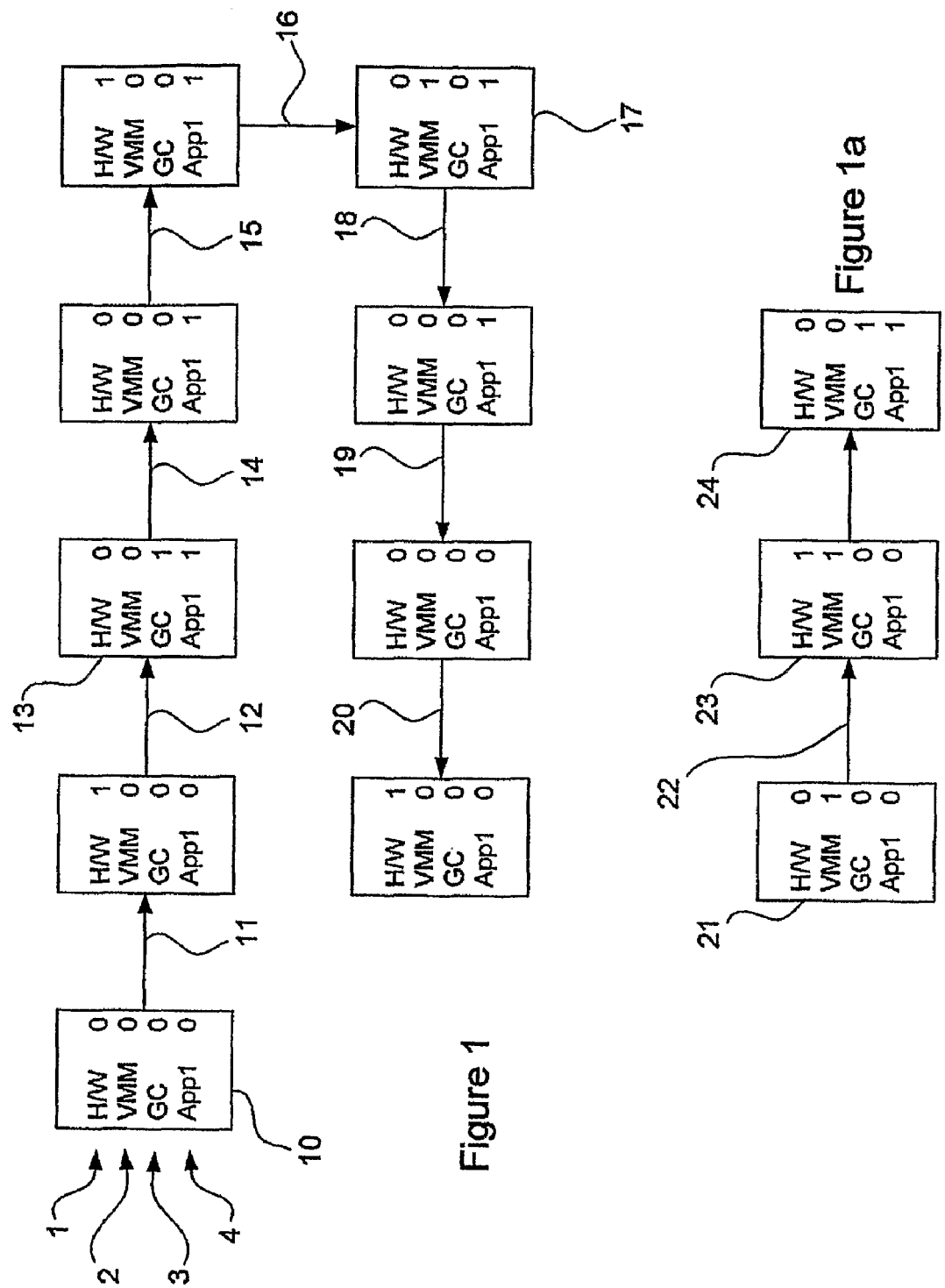
FIG. 1 is a flow chart illustrating the method of the invention.

Where a dirty flag is described as "set", it indicates that the page is dirty. Where a dirty flag is described as "reset", it indicates that the page is clean. The verbs "set" and "reset" have corresponding meanings. Resetting a dirty flag that is already in a reset state does not affect the state of the dirty flag. Similarly, setting a dirty flag that is already in a set state does not affect the state of the dirty flag. A dirty flag may be a conventional dirty bit or any other type of flag stored in memory. In the following description, the invention is described with reference to a conventional dirty bit. Backup flags may be a single bit or any suitable flag stored in memory.

Module includes any OS subsystem or user process or application, and includes the virtual memory manager or a garbage collector.

While the OS can make dirty bits available to the modules (by means of a new system call) there is usually only one dirty bit available for each memory page. Since this bit would need to be reset at different times by memory management routines in the kernel, by the garbage collector and any other module using the dirty bit, the ideal solution would be to provide more than one dirty bit in hardware for each memory page. All of the dirty bits corresponding to a given page would be set when the page is modified, but the OS, the garbage collector and other modules (or the system calls used to retrieve the bit) should be able to reset their bits independently. It is important to notice that pages that are dirty from the point of view of one module may not be dirty from the point of view of another module.

Since the existing MMC hardware usually only provides one dirty bit per memory page, that bit would need to be shared among all the interested components of the system, allowing the dirty bits to be used for functions other than their original purpose of optimising the virtual memory algorithms in the OS. Since the dirty bits need to be reset by different modules at different moments, if one module resets a dirty bit without letting other modules know, the modules will interfere with each other. To solve this problem, the invention provides "backup" dirty bit maps. One backup dirty bit map is provided for each module interested in the actual dirty bits. Each map must contain a backup bit corresponding to each physical memory page being used or being tracked by the method or system of the invention. These backup bits can be kept in dedicated structures or embedded in existing data structures in the kernel or modules, but each module must, be aware of the other modules' interest in the dirty bits and be able to locate and manipulate other modules' dirty bit maps.

For clarity, the invention will be described with reference to a single memory page. In practice, the invention will be applied to each page in memory, using backup dirty bit maps instead of a single backup dirty bits.

According to a preferred embodiment, each module treats a given memory page as dirty if either or both the hardware (page) dirty bit and/or its own backup dirty bit is/are set.

Where a module needs to reset the dirty bit of a given page, it resets both the hardware dirty bit and its own backup dirty bit. If and only if the hardware bit for the page was originally set, the module sets the corresponding bits of all other modules. Thus, the other modules will still see the page as dirty until they reset their bits.

This method is illustrated in FIG. 1, which shows a single hardware dirty bit 1, together with dirty bits 2, 3, 4 corresponding to the virtual memory manager (the VMM), a garbage collector (GC) and a further module, called App1.

In state 10, all of the dirty bits are reset, so each module sees the page as clean. In step 11, the page is written and the hardware dirty bit is set, by a process well-known in the art. In step 12, the VMM checks the page, sees the page as dirty, since the H/W bit is set, and resets the hardware dirty bit and its own backup dirty bit (which was already reset). Since the hardware bit was set, the VMM sets the bits of all other modules. Hence, in state 13 the GC and App1 backup dirty bits are set.

In step 14, the garbage collector checks the page. Since its own backup dirty bit is set, the garbage collector treats the page as dirty. The garbage collector resets its own backup dirty bit, but since the hardware bit was reset, the garbage collector does not set bits corresponding to other modules. In step 15, the page is again written and the hardware bit is set.

In step 16 the garbage collector checks the page. Since the hardware bit is set, the garbage collector treats the page as dirty. The garbage collector resets the hardware bit and its own backup dirty bit (which was already reset). Since the hardware dirty bit was set, the garbage collector sets bits corresponding to other modules, so the VMM at backup dirty bits is set in state 17.

In step 18, the VMM checks the page. Since its own backup dirty bit is set, the VMM sees the page as dirty. It resets its own backup dirty bit and the H/N bit. As the hardware dirty bit was reset, the VMM does not set backup dirty bits corresponding to other modules.

In step 19, App1 checks the page, seeing the page as dirty since its own backup dirty bit was set. App 1 resets its own dirty bit and the hardware dirty bit (which was already reset).

As the hardware dirty bit was already reset, App1 does not set backup dirty bits corresponding to other modules. In step 20 the page is again written.

In the above example, for clarity, it has been assumed that when a module checks the hardware dirty bit and its own backup dirty bit, those bits are reset and the other modules' backup bits are set. However, the setting and resetting step would occur only when a module marks the page as clean from its point of view. So, the act of checking can be performed without marking the page as clean and when this occurs, the states of the bits are left unchanged. Also, the resetting step preferably occurs only when the hardware dirty bit is in a set state immediately before or at the time the hardware dirty bit and the appropriate backup dirty bit are reset. The state of the hardware dirty bit may be determined by the checking step, or by a separate polling procedure.

This point is illustrated with reference to FIG. 1a. From state 21, the VMM checks the page and sees it as dirty. The VMM is interrupted 22. During this interruption the page is written, so that the hardware dirty bit is set in state 23. When the VMM marks the page as clean by resetting the hardware dirty bit and its own backup dirty bit, the hardware dirty bit is polled, and the GC and App1 backup dirty bits are set. If the hardware dirty bit were not polled at this stage, then the GC and App1 backup bits would not be set and GC and App1 would incorrectly see the page as clean.

Figure 2:
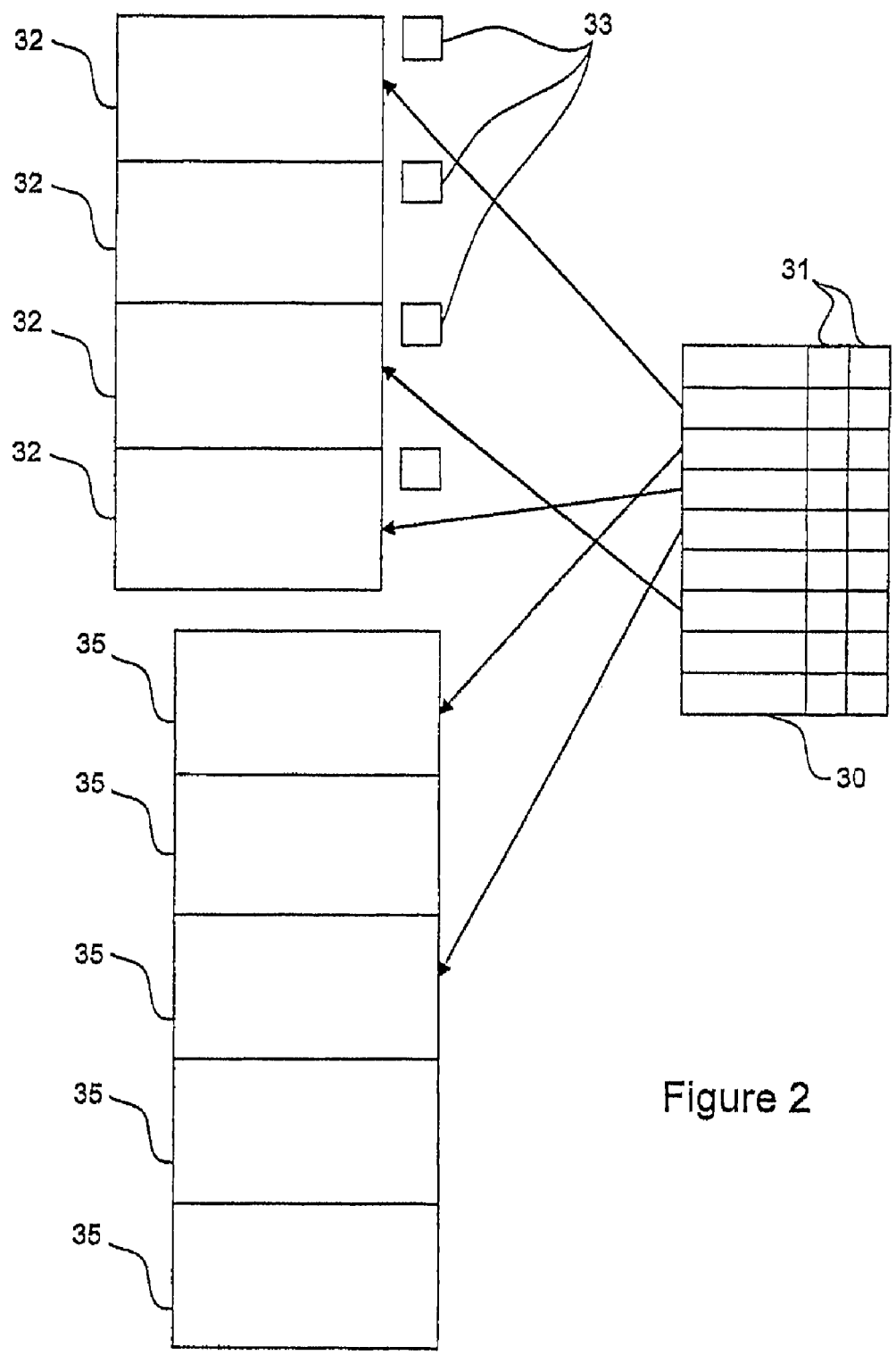
FIG. 2 shows the components of a system according to the invention.
Figure 3:
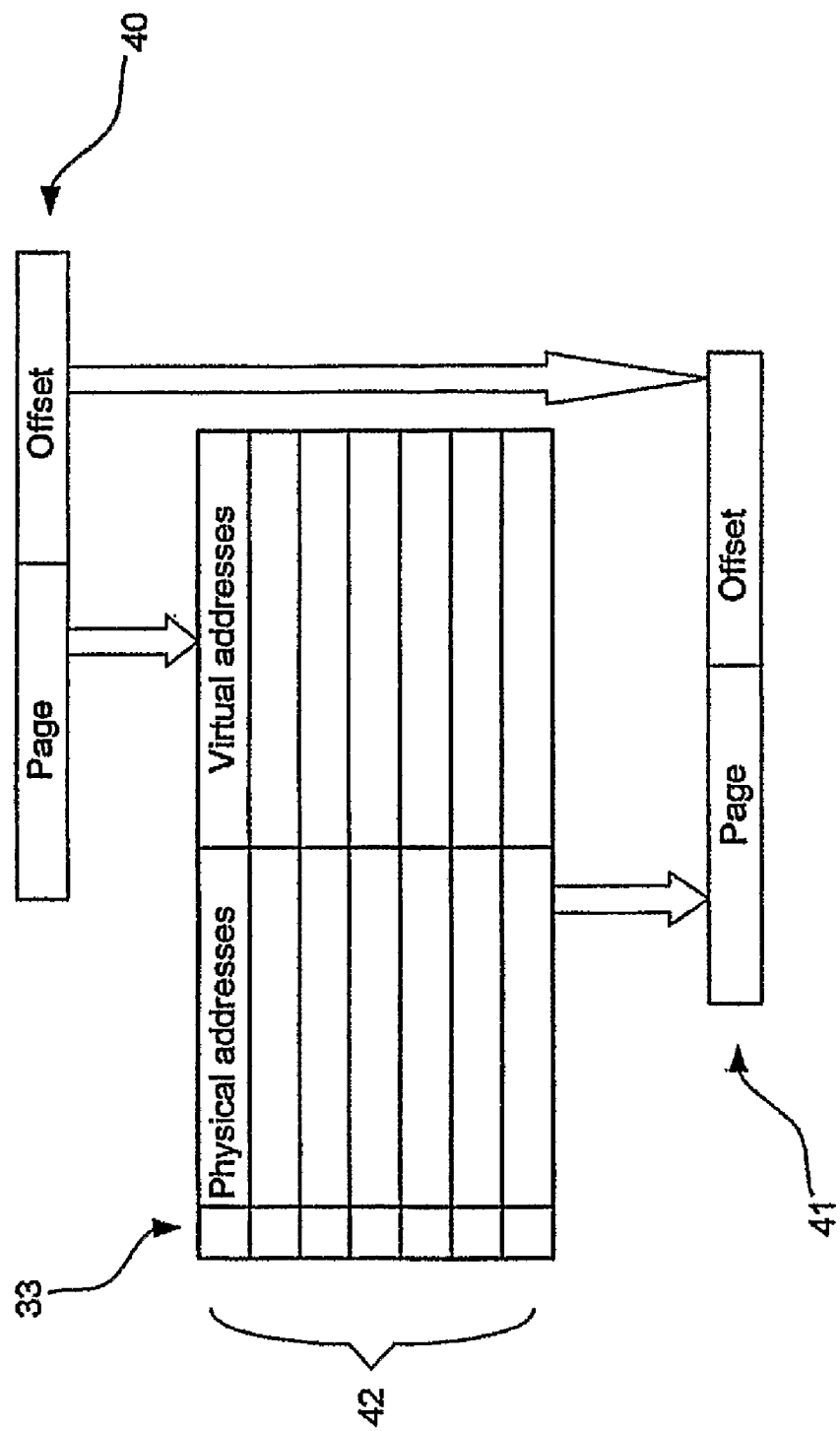
FIG. 3 shows a Memory Management Unit.

FIGS. 2 and 3 show the main components required.

Referring to FIG. 2, the per-process memory page table 30 is a software data structure that is part of the operating system and is stored in memory, preferably in memory corresponding to the OS kernel. It can contain entries referencing all pages that compose a process' address space. These pages can be loaded into physical memory, saved to disk or be pages that have not yet been initialized (so they are neither on disk nor in memory). It is in that OS structure that the backup dirty bits 31 are created. (Note that the implementation of that structure could vary depending on the OS. It could be a table, a linked list, etc.) Only the physical memory pages 32 have an associated hardware dirty bit 33. Even though these dirty bits are logically associated with physical pages (as shown in FIG. 2 for easy visualization), their actual location on the hardware is usually inside the MMU, as shown in FIG. 3. The system also includes a hard disk containing pages 35 swapped out from the physical memory.

FIG. 3 shows a generic representation of an MMU (or MMC) present in most modern computers. It translates the virtual memory addresses 40 referenced by the processes into physical memory addresses 41. Each address includes a page reference together with an offset, indicating a position within the page. When a process is scheduled to run, the OS initializes the MMU's address translation table 42 with the information contained in the memory page table 30 for that process. Only the entries related to pages 32 present in physical memory are loaded into the MMU. When a page 35 that is on disk or not initialized is referenced, the MMU automatically generates a trap for the OS. The OS then loads the page to memory (or creates it), and updates the information in the OS' memory page table 30 and the MMU with the new entry. The physical dirty bit 33 is usually part of these MMU entries, kept together with the corresponding memory page addresses.

Figure 4:
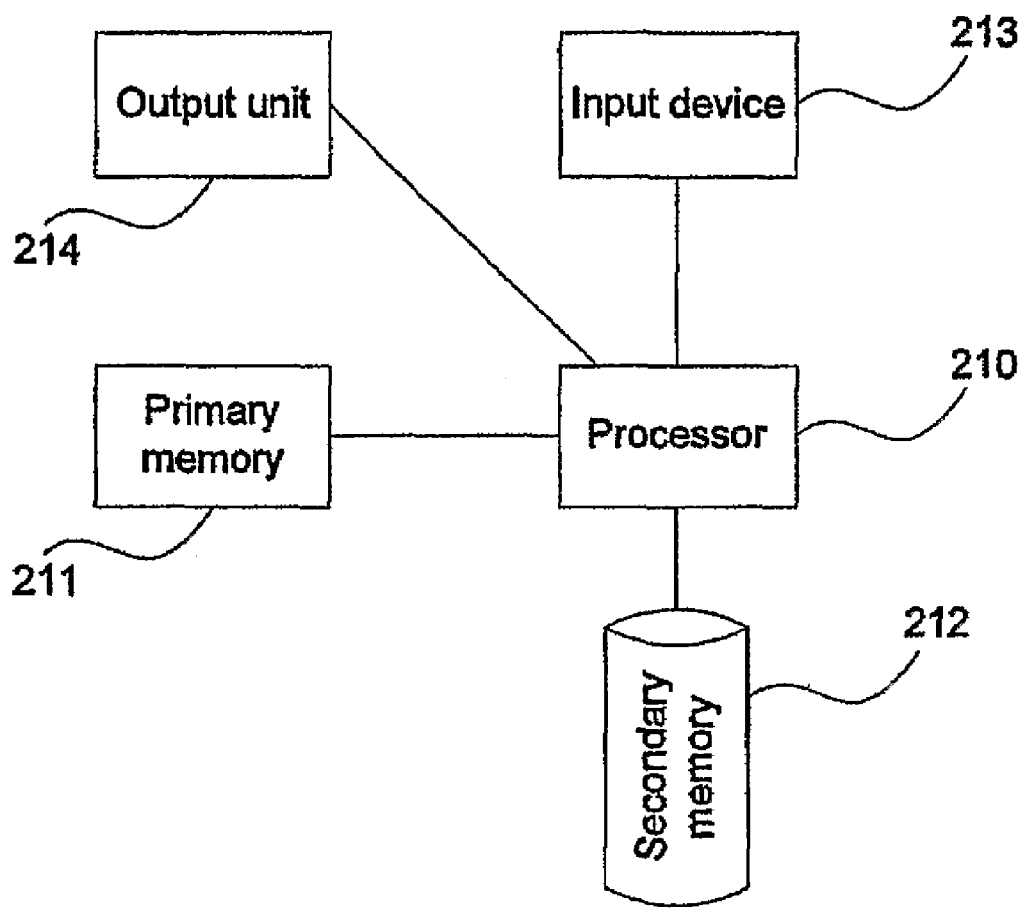
FIG. 4 shows a memory managing apparatus.

FIG. 4 is a schematic diagram of an apparatus including a processor 50 and memory 51, 52. The memory includes primary memory 51, which may be RAM, and secondary memory 52, which may be a hard disk. The apparatus also includes an input device 53, such as a mouse or keyboard, and an output unit 54, which may be a printer or display.

An example of a further module is a check pointing library. These libraries periodically save the status of a running programme, so that if its execution is interrupted for some reason, it can be restarted from the point the last checkpoint was saved. To accomplish this, files currently open must be saved, together with their current reading/writing position, and the current contents of the programme variables must also be saved. The invention allows a system to determine exactly which blocks of memory contain data changed since the last checkpoint. Only the changed blocks need to be saved again, thus optimising this process.

The invention allows a page dirty bit to be used by any number of modules. For each module a backup dirty bit is maintained. This allows modules to function more efficiently, resulting in more effective use of a computer's processing power.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative example s shown and described. Accordingly, departures may be made from such details without departure from the spirit or scope of the Applicant's general inventive concept.

The invention claimed is:

1. A method of managing memory, wherein the memory stores a page and the page has a corresponding dirty flag, the method including:
   providing a first backup flag for page;
   providing a second backup flag for the page;
   checking both the dirty flag and the first backup flag to determine whether the page is clean or dirty with respect to a first module; and
   checking both the dirty flag and the second backup flag to determine whether the page is clean or dirty with respect to a second module;
   resetting the dirty flag and the first backup flag to mark the page as clean with respect to the first module; and
   if the dirty flag is in a set state before the step of resetting the dirty flag and the first backup flag is performed, setting the second backup flag.

2. A method as claimed in claim 1, including:
   resetting the dirty flag and the second backup flag to mark the page as clean with respect to the second module; and
   if the dirty flag is in a set state before the step of resetting the dirty flag and the second backup flag is performed, setting the first backup flag.

3. A method as claimed in claim 1, including:
   providing a third backup flag for the page;
   checking both the dirty flag and the third backup flag to determine whether the page is clean or dirty with respect to a third module;
   resetting the dirty flag and the third backup flag to mark the page as clean with respect to the third module; and
   if the dirty flag is in a set state before the step of resetting the dirty flag and the third backup flag is performed, setting the first and second backup flags.

4. A method as claimed in claim 1, wherein the first module is a virtual memory manager.

5. A method as claimed in claim 1, wherein the first module is a garbage collector.

6. A method as claimed in claim 1, wherein the first module is a checkpointing module.

7. A method as claimed in claim 1, including maintaining the backup flags in an operating system.

8. A method as claimed in claim 1, including maintaining the backup flags in a table or linked list.

9. A method of managing memory, wherein the memory stores a page and the page has a corresponding dirty flag, the method including:
provingd a plurality of backup flags for the page, each backup flag corresponding to a module,
checking the dirty flag and the backup flag corresponding to a first module to determine whether the page is clean or dirty with respect to the first module;
resetting the dirty flag and the backup flag corresponding to the first module to mark the page as clean with respect to the first module; and
if the dirty flag is in a set state before the step of resetting the dirty flag and the backup flag is performed, setting each of the backup flags except the backup flag corresponding to the first module.

10. An apparatus including memory and a processor, the memory including primary memory, the processor being configured to perform the operations of a plurality of modules,
the primary memory being configured to store data in a page;
the apparatus being configured to maintain in the memory a dirty flag, a first backup flag and a second backup flag for the page; and
the processor being configured:
to determine whether the dirty flag and each of the backup flags is in a set or reset state, to check both the dirty flag and the first backup flag to determine, whether the page is clean or dirty with respect to a first module,
to check both the dirty flag and the second backup flag to determine whether the page is clean or dirty with respect to a second module,
to reset the dirty flag and the first backup flag to mark the page as clean with respect to the first module; and
to set the second backup flag if the dirty flag is in a set state before the dirty flag and the first backup flag are reset.

11. An apparatus as claimed in claim 10, the processor being configured to reset the dirty flag and the second backup flag to mark the page as clean with respect to the second module; and
to set the first backup flag if the dirty flag is in a set state before the dirty flag and the second backup flag are reset.

12. An apparatus as claimed in claim 10, configured to maintain a third backup flag for the page, and
the processor configured to check both the dirty flag and the third backup flag to determine whether the page is clean or dirty with respect to a third module, and
to reset the dirty flag and the third backup flag to mark the page as clean with respect to the third module, and
to set the first and second backup flags if the dirty flag is in a set state before the dirty flag and the third backup flag are reset.

13. An apparatus as claimed in claim 10 wherein the first module is a virtual memory manager.

14. An apparatus as claimed in claim 10 wherein the first module is a garbage collector.

15. An apparatus as claimed in claim 10 wherein the first module is a checkpointing module.

16. An apparatus as claimed in claim 10 wherein the processor is configured to perform the operations of an operating system and the apparatus is configured to maintain the backup flags in memory corresponding to the operating system kernel.

17. An apparatus including memory and a processor, said memory including primary memory, the processor being configured to perform the operations of a plurality of modules,
the primary memory being configured to store data in a page;
the apparatus being configured to maintain a dirty flag and a plurality of backup flags for the page, each backup flag corresponding to a module,
the processor being configured:
to determine whether the dirty flag and each of the backup flags is set or reset,
to check the dirty flag and the backup flag corresponding to a first module to determine whether
the page is clean or dirty with respect to the first module;
to reset the dirty flag and the backup flag corresponding to the first module to mark the page as clean with respect to the first module; and
to set each of the backup flags except the backup flag corresponding to the first module if the dirty flag is in a set state before the dirty flag and the backup flag corresponding to the first module are reset.

* * * * *